Oct. 25, 1966    S. KRILANOVICH    3,281,118
CAMERA HOIST WITH HYDRAULIC RISER
Filed April 8, 1965
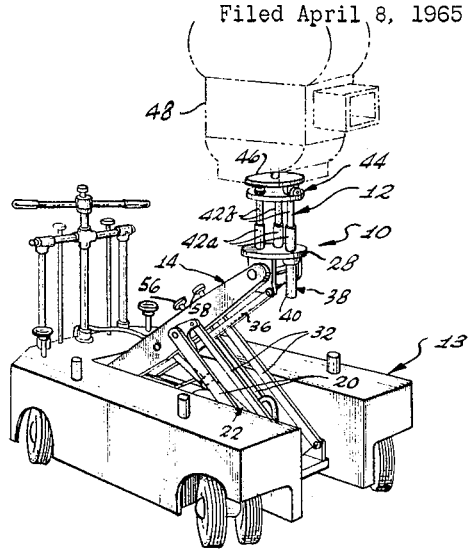
Fig. 1
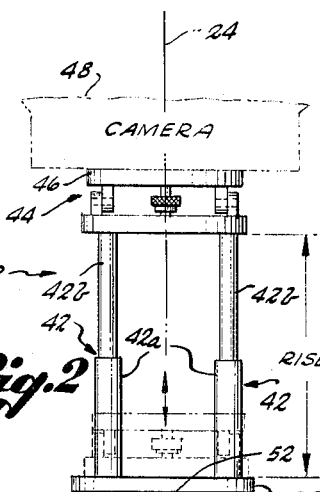
Fig. 2
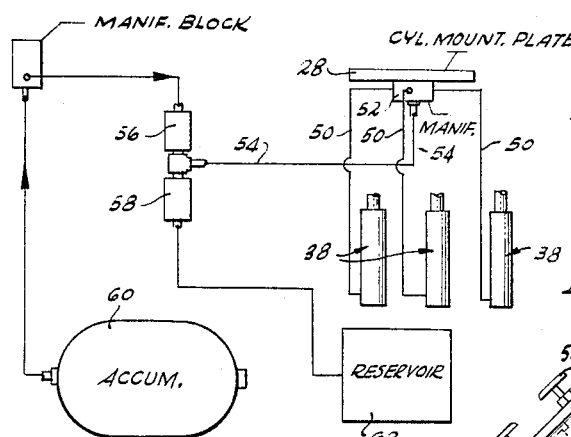
Fig. 3
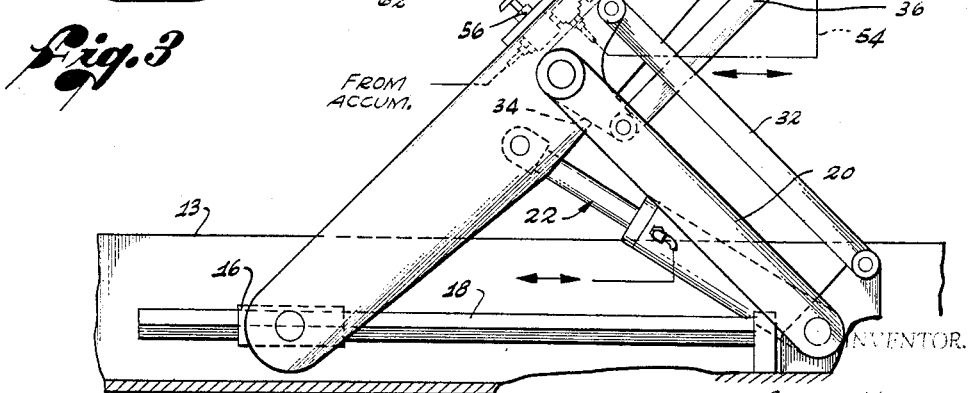
INVENTOR.
STEVE KRILANOVICH
BY Forrest J. Lilly
ATTORNEY United States Patent Office 3,281,118
Patented Oct. 25, 1966

3,281,118
CAMERA HOIST WITH HYDRAULIC RISER
Steve Krilanovich, Woodland Hills, Calif., assignor to Hydraulic-Riser Corp., North Hollywood, Calif., a corporation of California
Filed Apr. 8, 1965, Ser. No. 446,491
5 Claims. (Cl. 254—124)

This invention relates generally to camera hoists and has more particular reference to improvements in camera hoists of the type illustrated in United States Patent No. 2,766,007.

Motion picture and television cameras are commonly mounted on camera hoists which may be selectively raised and lowered to vary the camera elevation. When adjusting the elevation of a camera, it is usually desirable to vertically move the camera in such a way that the distance from the camera to the subject being filmed remains constant. This eliminates the necessity of adjusting the focus of the camera or the horizontal position of the hoist during adjustment of the camera elevation. Maintenance of such a fixed camera-to-subject distance is particularly important and desirable when a scene is filmed against a flat backdrop containing panoramic scenery printed or photographed upon a vertical screen. In order to maintain a fixed distance between a camera and the subject being filmed during adjustment of the camera elevation, it is necessary for the camera to move vertically along a direction line having no horizontal components, i.e., along a truly vertical direction line.

Some camera hoists are not effective to vertically move a camera along such a truly vertical direction line. Consider, for example, a camera hoist comprising a simple pivoted boom which swings about a fixed horizontal pivot axis at the inner end of the boom and mounts, at its outer end, a camera platform that remains horizontal as the boom raises and lowers. During vertical adjustment of this type of hoist, a camera mounted on the camera platform undergoes vertical movement along an arcuate direction line having both horizontal and vertical components. This type of hoist, therefore, produces a change in the camera-to-subject distance during vertical movement of the hoist to vary the camera elevation.

The aforementioned Patent No. 2,766,007 discloses a camera hoist which is uniquely constructed to vertically move a camera along a truly vertical direction line during vertical adjustment of the hoist to vary the camera elevation. This latter camera hoist comprises a boom which is pivotally connected at its inner end to slides movable lengthwise of the base of the hoist, and supporting arms which are pivotally connected at one end to the base and at their other end to the center of the boom. When the hoist raises and lowers, the inner end of the boom moves back and forth along the base and the supporting arms swing vertically relative to both the boom and base in such manner that the outer end of the boom undergoes movement along a direction line which is truly vertical throughout the range of adjustment of the hoist. This outer end of the hoist mounts a camera platform which remains horizontal in every position of vertical adjustment of the hoist.

The patented camera hoist discussed above, therefore, to quite satisfactory from the standpoint of its ability to maintain a fixed camera-to-subject distance during vertical adjustment of the hoist to vary the elevation of the camera. This camera hoist and other similar camera hoists, however, are deficient for the reason that the total range of vertical camera adjustment permitted by vertical movement of the hoist boom is quite limited. For this reason, it has been necessary to extend the range of vertical adjustment of the patented hoist by the use of spacers of different length for effectively adjusting the elevation of the camera platform relative to the boom of the hoist. The use of such spacers to extend the range of vertical adjustment of the hoist, however, is unsatisfactory for several reasons. First, replacement of the spacers requires removal of the camera from the camera platform and, therefore, is difficult and time consuming to accomplish. Secondly, the maximum extension of the effective range of vertical adjustment of the hoist permitted by the use of these spacers is limited. Thirdly, the spacers permit only a relatively few predetermined stepwise adjustments in the total vertical range of the hoist. If none of these permitted adjustment steps results in the camera elevation required for a particular scene, the camera platform must be adjusted to an elevation higher than that desired, by the use of the appropriate spacers, after which the boom of the hoist must be lowered to compensate for the excessive length of the spacers.

It is a general object of this invention to provide an improved means for extending the range of vertical adjustment of camera hoists of the type disclosed in the aforementioned Patent No. 2,766,007.

A more specific object of the invention is to provide a camera hoist of the type illustrated in the latter patent equipped with an improved camera platform elevating means or riser for selectively adjusting the elevation of the camera platform relative to the platform supporting boom of the hoist.

Another object of the invention is to provide a camera hoist of the character described wherein the improved camera platform riser permits progressive vertical adjustment of the camera platform relative to the platform supporting boom through a range substantially greater than that permitted by the platform spacers presently used for this purpose.

Yet another object of the invention is to provide a camera hoist of the character described wherein the extended vertical camera movement permitted by the improved camera platform riser of the invention occurs along the vertical direction line of camera movement resulting from vertical adjustment of the hoist itself.

A further object of the invention is to provide a camera hoist of the character described wherein the improved camera platform riser in no way interferes with the normal vertical movement of the boom of the hoist.

A still further object of the invention is to provide a camera hoist wherein the improved camera platform riser is relatively simple in construction, reliable in operation, easy to control, economical to manufacture, and otherwise ideally suited to its intended purposes.

Other objects, advantages, and features of the invention will become readily apparent as the description proceeds.

Briefly, the objects of the invention are attained by providing a camera hoist of the type illustrated in Patent No. 2,766,007 with an improved camera platform elevating means comprising a hydraulic riser which is operatively connected between the camera platform and the upper end of the boom of the hoist. This hydraulic riser comprises at least one, and preferably three, vertical, linear, hydraulic actuators which may be selectively pressurized and vented to effect vertical elevating and lowering of the camera platform. According to the preferred practice of the invention, each hydraulic actuator of the platform riser comprises a compound or multiple stage hydraulic actuator in order to maximize the extended vertical platform travel permitted by the riser. The riser is selectively pressurized and vented by operation of valve means which are mounted in a position accessible to the hoist operator.

The invention will now be described in greater detail by reference to the attached drawing, wherein:

FIG. 1 is a perspective view of a camera hoist embodying the invention;

FIG. 2 is an enlarged fragmentary side elevation of the hoist; and

FIG. 3 is a schematic diagram of the hydraulic system for the camera platform riser of the illustrated hoist.

In this drawing, there is illustrated a camera hoist 10 including an improved camera platform riser 12 according to this invention. Camera hoist 10, with the exception of the platform riser 12, is identical to the hoist disclosed in Patent No. 2,766,007. For this reason, the hoist will be described only in sufficent detail to enable a full and complete understanding of the present invention.

With this in mind, the camera hoist 10 comprises a supporting base 13 which is commonly a camera dolly. The boom of the hoist is designated by the reference numeral 14. The lower end of this boom is pivotally attached to a pair of slides 16 (only one shown) which are slidably supported on rails 18 secured to and extending in the fore and aft direction of the base 13. Arms 20 are pivotally connected at one end to the center of the boom 14 and at the other end to the base 13. Connected between the base and the boom is a hydraulic motor 22 for effecting vertical movement of the hoist between a lowered position wherein the boom 14 is generally horizontal and an elevated position wherein the boom stands upright at a small angle to the vertical.

When the hoist 10 is elevated, the slides 16 at the lower end of the boom 14 move forwardly (i.e., to the right in FIG. 2) along their supporting rails 18, the boom swings upwardly about its pivot connections to the slides, and the arms 20 swing upwardly and forwardly relative to the base 13. When the hoist is lowered, the slides move rearwardly along the rails, the boom swings downwardly about its pivot connections to the slides, and the arms 20 swing rearwardly and downwardly relative to base 13. During this raising and lowering of the hoist, the upper or outer end of the boom 14 undergoes vertical movement along a truly vertical direction line 24.

Pivotally mounted on the upper end of the boom 14 is a camera base 26 including an upper plate 28. Linkage 30, operatively connected between the main supportng base 13 of the hoist and the camera base 26, retains the base plate 28 horizontal as the boom 14 raises and lowers. This linkage includes a pair of first links 32 which parallel the hoist arms 20 and are pivotally connected between the supporting base 13 and a pair of bell cranks 34, respectively, pivoted on the boom, and a pair of second links 36 which parallel the longitudinal centerline of the boom and are pivotally connected between the bell cranks 34 and the camera base 26.

The camera hoist 10, as it has been described to this point, is identical, except for the hydraulic camera riser 12, to the camera hoist disclosed in Patent No. 2,766,-007. The camera riser 12, which represents the major contribution of this invention, comprises a plurality of hydraulic elevating units or linear actuators 38 mounted on and uniformly spaced about the centerline of the upper plate 28 of the camera base 26. As will appear from the ensuing description, while the camera riser is preferably equipped with three elevating units, as shown, any number of units may be employed. The elevating units are identical and each comprises a hydraulic cylinder 40 secured at its upper extremity to and depending below the camera base plate 28. The central axis of each cylinder 40 parallels the direction line 24 which the upper end of the boom 14 follows during vertical adjustment of the hoist 10.

Movable in each cylinder 40 is a piston 42. Preferably, the piston 42 of each elevating unit is a multiple stage piston including a number of telescoping sections. In the drawing, for example, each of the pistons 42 comprises two telescoping sections 42a and 42b. When the hydraulic riser 12 is fully lowered, these sections of each riser piston 42 are telescopically contracted within their respective cylinder 40, as shown in phantom lines in FIG. 2. When the riser is fully elevated, the sections of each piston are telescopically extended to their limit, as shown in solid lines in FIG. 2. The upper extremities of the inner piston sections 42b are attached, by leveling means 44, to a camera platform 46. These leveling means are adjustable to level the camera platform, i.e., locate the platform in a plane normal to the direction line 24 of vertical movement of the upper end of the hoist boom 14. Camera platform 46 is equipped with conventional means (not shown) to mount a camera 48 in a position wherein the camera is located on and is rotatable about an axis parallel to the direction line 24.

The hydraulic elevating units 38 illustrated are single acting, that is, hydraulically driven only in one direction, to wit, in the upward direction. The lower ends of the hydraulic cylinders 40 are connected, via hydraulic lines 50, to a manifold 52. Leading from this manifold is a hydraulic line 54 which connects to one port each of a supply valve 56 and a vent valve 58. The other port of supply valve 56 connects to a source 60 of hydraulic fluid under pressure. This source is typically a hydraulic accumulator, as shown. The other port of vent valve 58 connects to a hydraulic fluid reservoir or sump 62. Opening of the supply valve 56 communicates the cylinders to the pressurized source 60 of hydraulic fluid, thereby to elevate the camera riser 12. Opening of the vent valve 58 communicates the cylinders to the reservoir 62, thereby to lower the riser.

It is now apparent, therefore, that the present hydraulic riser 12 is effective to elevate and lower the camera platform 46, and thereby the camera 48, relative to the boom 14 of the camera hoist 10 and along the vertical direction line 24 of movement of the outer end of the boom. Accordingly, the riser extends the effective vertical travel of the camera hoist 10 without destroying the ability of the hoist to maintain a fixed camera-to-subject distance. In this regard, the depending hydraulic cylinders 40 of the riser are arranged to clear the underlying parts of the hoist 10 when the later is lowered. Accordingly, the riser extends, in effect, the upper limit of vertical travel of the hoist without altering its lower limit of travel and, thereby, extends the overall vertical travel of the hoist, and hence the camera 48.

The hoist 10, of course, raises and lowers in the manner heretofore described and explained in greater detail in the aforementioned Patent No. 2,766,007. In connection with the operation of the hoist 10, it is significant to note that the hoist arms 20 provide, in effect, a swinging fulcrum for the boom 14 about which the boom rocks as it is raised and lowered. The slides 16 and their supporting rails 18 provide a combined slide pivot connection between the lower end of the boom and the supporting base 13 of the hoist, which permits the lower end of the boom to move horizontally along the base as the boom raises and lowers, thereby to enable the upper end of the boom to move along the vertical direction line 24.

It is apparent, therefore, that the invention herein described and illustrated is fully capable of attaining the several objects and advantages preliminarily set forth.

While a presently preferred embodiment of the invention has been disclosed for illustrative purposes, various modifications in the design, arrangement of parts, and instrumentalities of the invention are possible within the spirit and scope of the following claims.

What is claimed as new in support of Letters Patent is:

1. A camera hoist comprising:
   a supporting base,
   a swinging fulcrum pivoted on said base,
   a boom pivoted midway between its ends upon said fulcrum,
   a slide pivot connection between the lower end of said boom and said base,
   means for effecting vertical swinging movement of said boom between a lowered position and an elevated position, the upper end of said boom undergoing linear movement along a normally vertical direction line during swinging movement of said boom between said positions,
a camera base pivotally mounted on said upper end of said boom,
linkage means operatively connected between said camera base and said supporting base for maintaining said camera base at a fixed angle to said direction line during swinging movement of said boom between said positions,
a camera platform overlying said camera base, and
power operated riser means operatively connected between said camera base and said camera platform for effecting vertical movement of said camera platform relative to said camera base along a direction line parallel to said first-mentioned direction line.

2. A camera hoist according to claim 1 wherein:
said riser means comprises a hydraulic cylinder mounted on said camera base with its axis parallel to said first-mentioned direction line and a piston movable in said cylinder including a rod secured to said camera platform.

3. A camera hoist according to claim 1 wherein:
said riser means comprises a hydraulic cylinder secured at one to and depending below said camera base, and a piston movable in said cylinder and including a rod secured to said camera platform.

4. A camera hoist comprising:
a supporting base,
a swinging fulcrum pivoted on said base,
a boom pivoted midway between its ends upon said fulcrum,
a slide pivot connection between the lower end of said boom and said base,
means for effecting vertical swinging movement of said boom between a lowered position and an elevated position,
the upper end of said boom undergong linear movement along a normally vertical direction line during swinging movement of said boom between said positions,
a camera base pivotally mounted on said upper end of said boom,
linkage means operatively connected between said camera base and said supporting base for maintaining said camera base at a fixed angle to said direction line during swinging movement of said boom between said positions,
a camera platform overlying said camera base,
a plurality of hydraulic riser cylinders secured at one end to and depending below said camera base at positions generally uniformly spaced about said camera base,
the axes of said cylinders paralleling said direction line,
pistons movable in said cylinders, respectively, and including piston rods extending above said camera base and attached to said camera platform, and
means for selectively pressurizing and venting said cylinders, thereby to effect vertical movement of said camera platform relative to said camera base along a direction line parallel to said first-mentioned direction line.

5. A camera hoist according to claim 4 wherein:
said pistons each comprise a multiple stage piston assembly including a number of telescoping sections.

References Cited by the Examiner
UNITED STATES PATENTS 2,766,007 10/1956 Krilanovich _____ 254—124
3,168,284 2/1965 Fisher _____ 254—8

WILLIAM FELDMAN, *Primary Examiner.*

O. M. SIMPSON, *Assistant Examiner.*